Figure 1:
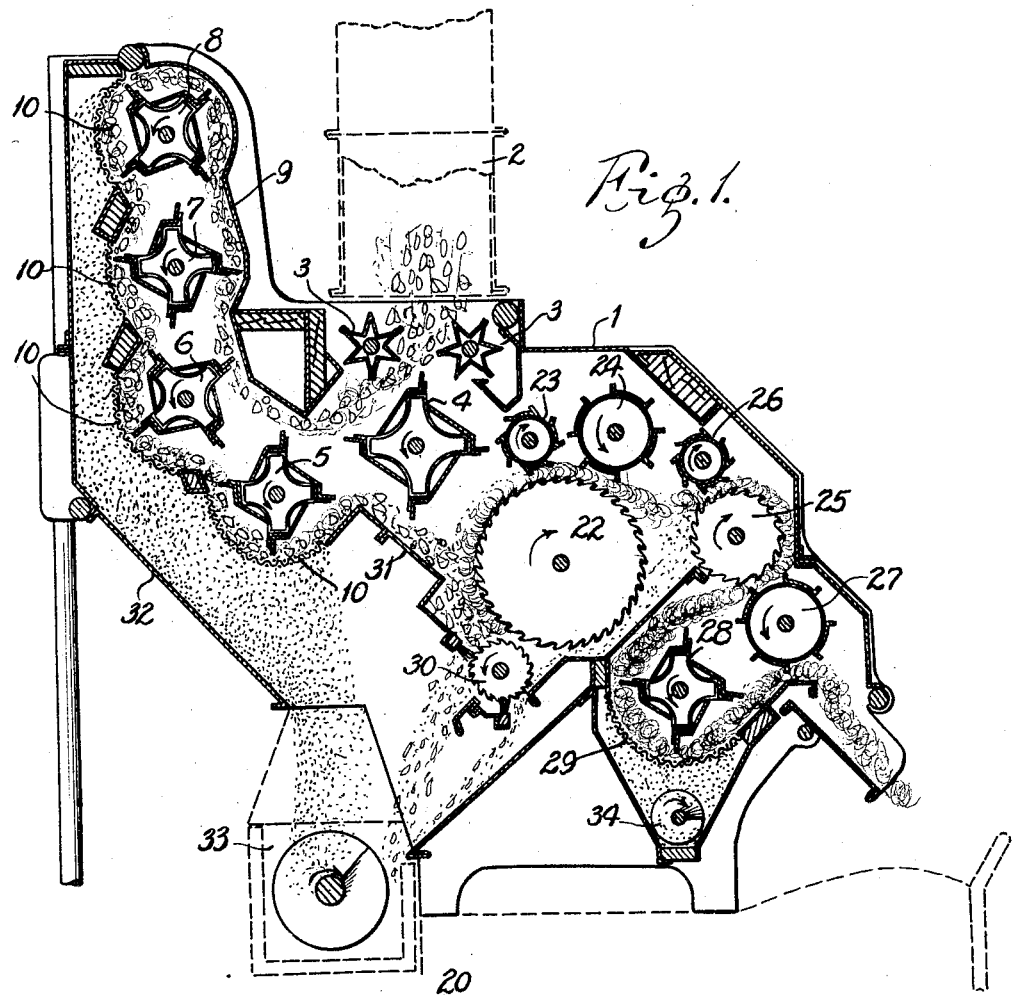

April 25, 1933.  J. E. MITCHELL  1,906,076
COTTON CLEANING EQUIPMENT

Filed April 17, 1931

INVENTOR:
JOHN E. MITCHELL.
By Bruce S. Elliott
ATTORNEY.

Patented Apr. 25, 1933

1,906,076

UNITED STATES PATENT OFFICE

JOHN E. MITCHELL, OF DALLAS, TEXAS

COTTON CLEANING EQUIPMENT

Application filed April 17, 1931. Serial No. 530,768.

This invention relates to that type of cotton cleaning equipment in which a series of threshing cylinders are arranged in superposed relation in an upright housing, and so disposed that the cotton is passed from the lowest to the highest threshing cylinders along one side of the series, and from the highest back to the lowest along the other side. In the preferred embodiment of the invention, the threshing cylinders on this latter side are surrounded with screens so that dust, sand and smaller trash particles mixed with the cotton may be separated therefrom. However, the invention is primarily concerned with the use of bars or blades for more effectively elevating and transferring the cotton from one cylinder to another in a series of cylinders vertically arranged one above the other.

In the past, so far as I am aware, the threshing cylinders in all cleaners of this type have been equipped with spikes or pins for loosening up the trash in the cotton and for breaking the bolls. These spiked cylinders are not very efficient in the performance of their intended function, for the reason that they are not positive enough in action in transferring the cotton from one cylinder to another. For example, a certain percentage of the cotton mixed with the hulls bolls and trash, when thrown upward by the lowest cylinder in the series may strike a gap between the spikes on the next highest cylinder, and instead of being transferred to the latter, is carried along through the space between the cylinders. In other words, it by-passes the higher of the two cylinders and goes out of the cleaner after receiving only a fraction of the threshing action it would have received if it had been properly transferred from one cylinder to the next, and thus carried through the entire cleaner.

This failure of a positive transfer of the cotton from the lowest threshing cylinder to the one immediately above it, as just described, applies to the latter cylinder and the one immediately above it, and so on throughout the series of four or more threshing cylinders, as usually employed, with the result that the by-passed cotton, that is all of the cotton passed between adjacent cylinders, as well in the upward as in the downward movement of the cotton, is discharged from the cleaner without receiving the maximum treatment of which the cleaner is capable.

Another disadvantage of the spiked cylinders is their tendency to rope and twist the locks of cotton.

The present invention overcomes the objection inherent in the type of cleaner referred to by providing for a positive transfer of the cotton in succession from the lowest to the highest threshing cylinder, and from the latter back to the lowest threshing cylinder again. This result is effected by substituting for the spiked cylinders, cylinders having longitudinal vanes or blades thus eliminating the spaces that occur between the spikes of the spiked cylinder. The blades therefore, make positive engagement with all of the cotton, bolls, trash etc., and completely transfer the material from one cylinder to the next, so that all of the material is bound to make the entire circuit of the cleaner and to receive the maximum treating action of which the latter is capable.

As a result of my invention, I find that the cotton is not only cleaned to a very much greater extent than when spiked cylinders are employed, and this without roping or twisting the cotton, but also a greater amount of the bolls are opened or broken, by reason of the greater number of impacts that occur in the use of vanes as compared with the use of separated spikes.

The invention is illustrated in the accompanying drawing, in which—

Figure 2:
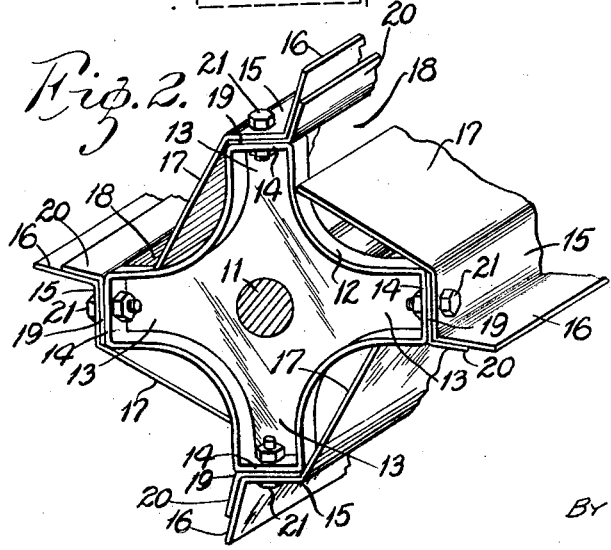

Figure 1 is a vertical, longitudinal sectional view through a complete cotton feeding, cleaning and extracting machine equipped with my novel cleaning mechanism; and Figure 2 is a perspective view, illustrating a portion of one of the threshing cylinders employed in the cleaner.

Referring now to the drawing, the numeral 1 indicates, generally, the casing of a complete cotton feeding, extracting and cleaning machine. The numeral 2 indicates a chute, shown by dotted lines, which delivers the boll cotton from a distributor of conventional type to the feed cylinders 3 of the machine. Immediately below the feed cylinders is located a directing cylinder 4, which serves to continuously transfer the cotton fed into the machine to the cleaner constituting the main part of the invention. This cleaner comprises a series of threshing cylinders 5, 6, 7, and 8 the axes of the cylinders 6, 7, 8, being substantially in vertical alignment, and the cylinder 5 being located centrally between the directing cylinder 4 and the threshing cylinder 6, with its axis located in a plane below the planes of the axes of cylinders 4 and 6. The cylinders 6, 7, 8, are enclosed in an upright housing one wall of which, that on the right in Figure 1, and indicated by the numeral 9, is imperforate, and the other wall of which consists of a series of circular screens 10, which partly surround the respective threshing cylinders 5, 6, 7, and 8, the latter being adapted to be rotated in the direction indicated by the arrows, with their blades in close proximity to the respective screens.

As shown by Figure 2, each of the threshing cylinders comprises a shaft 11, having mounted thereon a series of cruciform spiders 12, having 4 arms 13 providing flat circumferential portions 14, located directly opposite each other. The flat portions 14 of the spiders are in alignment with each other and mounted on each line of flat portions 14 is a sheet metal member 15, shaped to provide a blade 16 and an apron 17, each of the aprons 17 extending from the corners of one line of flat portions in an inclined direction to the sides of the adjacent line of arms 13 below the corners of their flat portions 14. These aprons form as it were, the wall of the threshing cylinder but do not entirely enclose the same, providing openings 18 through which trash, dirt and other material may escape from the inside of the cylinders. Interposed between each member 15 and the flat portions 14 of each spider, is a metal strip 19, which is bent upon itself to form a flange 20, which rests against the rear side of each blade 16, and acts as a brace therefor. The metal members 15 and 19 are secured to the spiders 14 by means of bolts 21. It may be stated that the directing cylinder 4 is slightly larger in size than the threshing cylinders but it is constructed in the same manner.

The remainder of the machine illustrated does not enter into the present invention, but is shown so that the general operation may be better understood. This part of the machine constitutes the extracting mechanism, and may be briefly described as consisting of a saw cylinder 22, a kicker roll 23, a doffing cylinder 24, a second saw cylinder 25, a kicker roll 26, and doffer 27, a threshing cylinder 28 rotating in proximity to a screen 29, and a reclaiming saw cylinder 30, and a hull board 31 for directing the cotton passing from the cleaner to the saw cylinder 22. At the left of the machine, as shown in Figure 1, the bottom wall 32 of the casing is inclined downwardly to receive the refuse passing through screens 10 and direct the same to a conveyor 33, which delivers it outside the machine. A similar conveyor 34 removes from the machine the refuse which passes through screens 29.

In operation, cotton delivered through the chute 2 is engaged by the feed rollers 3 and fed in regulated quantities into the machine. It is immediately engaged by the rotating directing cylinder 4 and thrown against, and into the space immediately above the threshing cylinder 5. As it rotates, this cylinder, by force of impact and by centrifugal action, throws the cotton, bolls, trash etc., upward and to the right of the threshing cylinder 6, which transfers it to cylinder 7, which in turn transfers it to the cylinder 8. In its passage upward along the right hand side of the threshing cylinder and past the imperforate wall 9, the cotton is loosened and some of the bolls are broken and opened. On being carried around by the uppermost threshing cylinder 8, the cotton is drawn over its screen 10, and a certain amount of the dust, dirt and trash passes through its screen. The material is then delivered to the threshing cylinder 7, which carries it over its screen 10, and this process is repeated until the lowermost threshing cylinder 5 delivers it to the hull board 31, such action being facilitated by the blades of the lower half of the directing cylinder 4. The cotton passing down the hull board 31 is engaged by the saw cylinder 22, and thereafter the extracting of cotton from the hulls proceeds in the well known manner, which need not be more fully described.

From the above description, it will be seen that by providing for the positive movement of the boll cotton through the cleaner from the lower to the upper end thereof, and then downward over a series of screens 10, I secure the maximum threshing and cleaning action on the cotton, entirely eliminating all by-passing of the cotton between the threshing cylinders. Such a result, so far as I am aware, has never heretofore been accomplished.

I claim:

1. Cotton cleaning equipment comprising an upright housing having a series of separated bladed threshing cylinders mounted in superposed co-operative relation therein, means for delivering the cotton to be cleaned into proximity to the lowermost of said threshing cylinders at one side thereof, whereby said cotton will be successively projected, by the blades of the threshing cylinders, from the lowest to the highest cylinder along one side of the series of cylinders, and will then be passed downward from the highest to the lowest cylinder along the other side of the series of cylinders, and means for delivering the cotton from the lowermost of said threshing cylinders.

2. Cotton cleaning equipment comprising an upright housing having a series of separated, bladed threshing cylinders mounted in superposed co-operative relation therein, screening mechanism co-operating with said cylinders, and means for continuously projecting the cotton to be cleaned into proximity to the lowermost of said threshing cylinders at one side thereof, whereby said cotton will in turn be successively projected, by the blades of the threshing cylinders, from the lowest to the highest cylinder along one side of the series of cylinders and will then be passed downward from the highest to the lowest cylinder along the other side of the cylinders, and means for delivering the cotton from the lowermost of said threshing cylinders.

3. Cotton cleaning equipment comprising, in combination with feed rollers for delivering regulated quantities of boll cotton, a series of separated, bladed threshing cylinders mounted in superposed co-operative relation, an upright housing enclosing said threshing cylinders, and a directing cylinder located beneath said feed rollers and positioned to deflect cotton delivered by the latter to the lowermost of said threshing cylinders at one side thereof, whereby said cotton will be successively projected, by the blades of the threshing cylinders, from the lowest to the highest cylinder along one side of the series of cylinders, and will then be passed downward from the highest to the lowest cylinder along the other side of the cylinders, and means for delivering the cotton from the lowest of said threshing cylinders.

4. In cotton cleaning equipment, a series of superposed separated threshing cylinders, each of which is provided with a plurality of longitudinal blades projecting from its periphery, said cylinders being arranged in such proximity to each other that cotton engaged by the blades of the cylinder at the lower end of the series will be transferred to the blades of the adjacent cylinder by projection, and so on to the end of the series, and will then be moved in like manner in the opposite direction throughout the length of the series of cylinders, and a housing enclosing said cylinders with its walls in proximity thereto and provided with screens co-operating with said cylinders, and with a discharge outlet for cotton that has made the circuit of the cylinders.

5. Cotton cleaning equipment comprising an upright housing having a series of separated threshing cylinders mounted in superposed co-operative relation therein, and each of which is provided with a plurality of longitudinal blades, a series of screens arranged in one wall of said housing and partly surrounding, respectively, one side of each of said cylinders, and means for continuously projecting the cotton to be cleaned into proximity to the lowermost of said threshing cylinders at the side thereof remote from its screen, whereby said cotton will in turn be successively projected, by the blades of the threshing cylinders, from the lowest to the highest cylinder along one side of the series of cylinders, and will then be passed downward from the highest to the lowest cylinder along the other side of the series of cylinders and over the respective screens thereof, and means for delivering the cotton from the lowermost of said threshing cylinders.

6. Cotton cleaning equipment, comprising a series of separated, bladed threshing cylinders mounted in superposed co-operative relation, an upright housing enclosing said cylinders, with its walls located in relatively close proximity thereto, one wall of said housing being imperforate and the other wall having a series of screens located, respectively, opposite the sides of the respective cylinders, and means for continuously projecting the cotton to be cleaned into proximity to the lowermost of said threshing cylinders at the side thereof adjacent the imperforate wall of said housing, whereby said cotton will in turn be successively projected, by the blades of the threshing cylinders, from the lowest to the highest cylinder along one side of the series of cylinders, and will then be passed downward from the highest to the lowest cylinder along the other side of the series of cylinders and over the respective screens thereof, and means for delivering the cotton from the lowermost of said threshing cylinders.

7. Cotton cleaning equipment comprising, in combination with feed rollers for delivering regulated quantities of boll cotton, a series of separated, bladed threshing cylinders mounted in superposed co-operative relation, an upright housing enclosing said threshing cylinders with its walls positioned in proximity thereto, one of said walls being provided with a series of screens located, respectively, opposite the sides of the respective cylinders, and a directing cylinder located beneath said feed rolls and positioned to deflect cotton delivered by the latter to the lowermost of said threshing cylinders on the side thereof remote from its screen, whereby said cotton will be successively projected, by the blades of the threshing cylinders, from the lowest to the highest cylinder along one side of the series of cylinders, and will then be passed downward from the highest to the lowest cylinder along the other side of the series of cylinders and over the respective screens thereof, and means for delivering the cotton from the lowest of said threshing cylinders.

In testimony whereof, I have hereunto set my hand.

JOHN E. MITCHELL.